United States Patent
Bhoj et al.

(10) Patent No.: US 6,742,016 B1
(45) Date of Patent: May 25, 2004

(54) REQUEST ACCEPTOR FOR A NETWORK APPLICATION SYSTEM AND A METHOD THEREOF

(75) Inventors: Preeti N. Bhoj, Cupertino, CA (US); Srinivas Ramanathan, Abirampuram (IN); Sharad Singhal, Belmont, CA (US)

(73) Assignee: Hewlett-Packard Devolpment Company, L.P., Houston, TX (US)

( * ) Notice: Subject to any disclaimer, the term of this patent is extended or adjusted under 35 U.S.C. 154(b) by 0 days.

(21) Appl. No.: 09/535,101

(22) Filed: Mar. 24, 2000

(51) Int. Cl.[7] .............................................. G06F 13/14
(52) U.S. Cl. ...................... 709/207; 709/217; 709/228; 709/239; 370/234
(58) Field of Search ................................. 709/225, 207, 709/217, 228, 239; 370/234

(56) References Cited

U.S. PATENT DOCUMENTS

| | | | | | |
|---|---|---|---|---|---|
| 5,623,603 A | * | 4/1997 | Jiang et al. | ................. | 709/207 |
| 5,699,521 A | * | 12/1997 | Iizuka et al. | ................ | 709/240 |
| 5,799,002 A | * | 8/1998 | Krishnan | .................... | 370/234 |
| 6,006,269 A | * | 12/1999 | Phaal | ......................... | 709/227 |
| 6,055,564 A | * | 4/2000 | Phaal | ......................... | 709/207 |
| 6,154,769 A | * | 11/2000 | Cherkasova et al. | ........ | 709/207 |
| 6,226,377 B1 | * | 5/2001 | Donaghue, Jr. | ............. | 709/201 |
| 6,330,719 B1 | * | 12/2001 | Zigmond et al. | ........... | 725/121 |
| 6,360,270 B1 | * | 3/2002 | Cherkasova et al. | ........ | 709/229 |
| 6,434,559 B1 | * | 8/2002 | Lundberg et al. | ........... | 709/207 |

* cited by examiner

*Primary Examiner*—David Wiley
*Assistant Examiner*—Alina Boutah (57) ABSTRACT

An acceptor for admitting incoming requests to a server application includes a session manager that determines the class of an incoming request. The class includes a first class and a second class. A queuing module is provided to store the request if the incoming request is of the second class. A priority control module is provided to ensure that a predetermined number of requests are sent to the server application for service in each cycle. The priority control module allows (1) the predetermined number of the first class requests to be sent to the server application if the first class requests received in a cycle are at least equal to the predetermined number, and (2) a mixture of the first class requests and the second class requests to be sent to the server application if the first class requests received in a cycle are less than the predetermined number. A method of handling incoming requests to the server application is also described.

16 Claims, 8 Drawing Sheets

REQUEST ACCEPTOR FOR A NETWORK APPLICATION SYSTEM AND A METHOD THEREOF

BACKGROUND OF THE INVENTION

1. Field of the Invention

The present invention pertains to the Internet. More particularly, this invention relates to an improved request acceptor for a server application system that allows early prioritization and adapted processing of requests accessing the server application, and a method thereof.

2. Description of the Related Art

Figure 1:
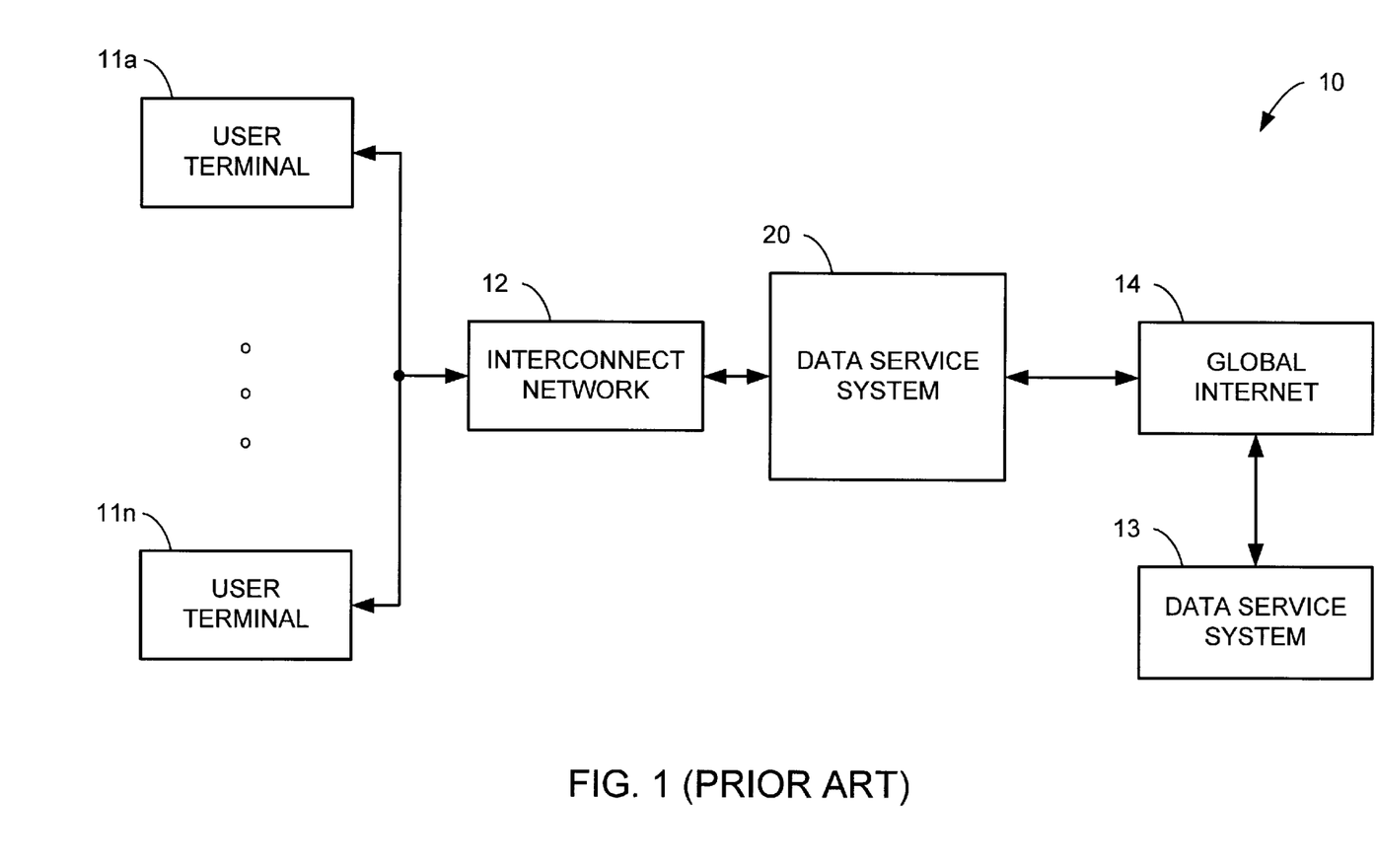
FIG. 1 schematically shows the structure of the Internet.

With the rapid growth of the Internet, more and more business and residential users are beginning to rely on the Internet for their mainstream and mission-critical activities. As is known, the Internet typically refers to a number of data service systems connected together via a high speed interconnect network (see FIG. 1). Each data service system typically includes Internet server applications that host content for various customers. The Internet server applications can also host applications. Remote user terminals (e.g., terminals 11a–11n in FIG. 1) may be connected to a data service system (e.g., the data service system 20 in FIG. 1) via an interconnect network. Each user terminal is equipped with a web browser (or other software such as an e-mail software) that allows the user terminal to access the content and/or applications hosted in various data service systems.

Popular Internet applications include World Wide Web (WWW), E-mail, news, and FTP applications. All of these applications follow the client-server model and rely on the Transmission Control Protocol (TCP) for reliable delivery of information/applications between severs and user terminals. These applications can also be referred to as server applications. A user can access a server application (e.g., web server) by generating at least one request to the corresponding server application. The server application then services the request. A server application can be accessed by multiple users at the same time. The server application typically handles the user access requests in a first-in-first-out (FIFO) fashion.

Figure 2:
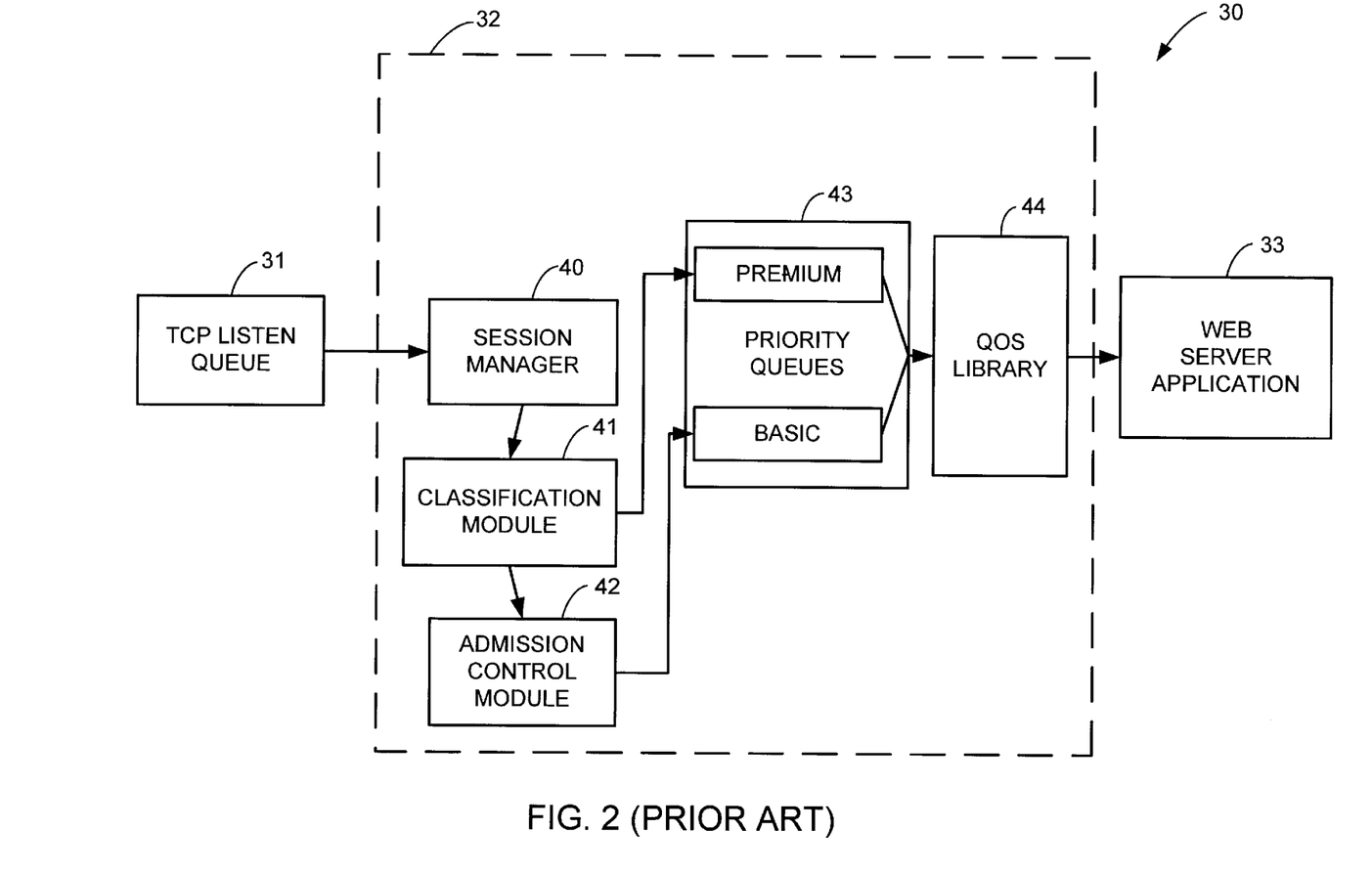
FIG. 2 shows one prior art acceptor for a server application system.

One problem of the above-identified prior art server application is that it does not have protection mechanism against excessive load conditions. Another problem is that the server application does not provide performance guarantees to its customers that host their content/service sites in the server application. To overcome these problems, prior proposals have been made to add quality-of-service (QoS) middleware in the server application. FIG. 2 illustrates one such prior proposal. As can be seen from FIG. 2, the QoS middleware 32 includes a session manager 40, a classification module 41, and an admission control module 42. The session manager 40 determines whether an incoming request is part of an existing session or not. The classification module 41 then associates the request with a class. If the request is part of an existing session, the classification module 41 associates the request with a premium class. If not, the classification module 41 associates the request with a basic class. The premium requests are sent to a premium queue in the priority queues 43 while the basic requests are sent to a basic queue in the priority queues 43. This allows the middleware 32 to offer differential treatment for existing session requests relative to new session requests. Following classification, the admission control module 42 determines whether a basic request should be admitted for service or rejected before it is sent to the priority queues 43.

Disadvantages are, however, still associated with this prior approach. One disadvantage is that the processing of the session manager 40 and the classification module 41 is still done in a FIFO manner (i.e., sequential processing). This makes those premium requests to wait in the middleware until they are processed. The differential treatment offered by the middleware 32 is effective only after the requests have been inserted into the priority queues 43. This means that the middleware 32 may still become a bottleneck in terms of processing the incoming requests. The middleware 32 becomes a bottleneck when it is receiving a large number of requests. If it becomes the bottleneck, the middleware 32 is not able to offer differential service because of its use of FIFO scheduling.

Another disadvantage is that manual configuration and tuning of the middleware and/or the server application is typically required to ensure optimal performance. This is a significant task for the operator of the server application because many of the settings require in-depth understanding of the structure and operation of the server application, as well as that of the middleware. For example, the operator has to specify parameters such as the maximum lengths of the priority queues in the middleware 32. Even the admission control criteria (e.g., CPU utilization, queue length, etc.) has to be specified by the operator. In addition, the optimal values of these parameters are also different for different workloads of the server application. Thus, the operator may need to constantly tune the parameters manually to ensure optimal performance since the workloads change from time to time.

SUMMARY OF THE INVENTION

One feature of the present invention is to allow early prioritization of the incoming requests in a server application system.

Another feature of the present invention is to allow adapted processing of classified requests in a server application system.

A further feature of the present invention is to provide means in a server application system for allowing early prioritization and adaptive processing of incoming requests.

An acceptor for admitting incoming requests to a server application includes a session manager that determines the class of an incoming request. The class includes a first class and a second class. A queuing module is provided to store the request if the incoming request is of the second class. A priority control module is provided to ensure that a predetermined number of requests are sent to the server application for service in each cycle. The priority control module allows (1) the predetermined number of the first class requests to be sent to the server application if the first class requests received in a cycle are at least equal to the predetermined number, and (2) a mixture of the first class requests and the second class requests to be sent to the server application if the first class requests received in a cycle are less than the predetermined number.

A method of admitting incoming requests to a server application includes the step of determining the class of an incoming request. The class includes a first class and a second class. The request is stored in a queuing module if the incoming request is of the second class. A predetermined number of the first class requests are sent to the server application if at least the predetermined number of the first class requests are received in a cycle. If the number of the first class requests received in a cycle is less than the predetermined number, then a mixture of the first class and second class requests equal to the predetermined number are sent to the server application.

Other features and advantages of the present invention will become apparent from the following detailed description, taken in conjunction with the accompanying drawings, illustrating by way of example the principles of the invention.

DETAILED DESCRIPTION OF THE INVENTION

Figure 3:
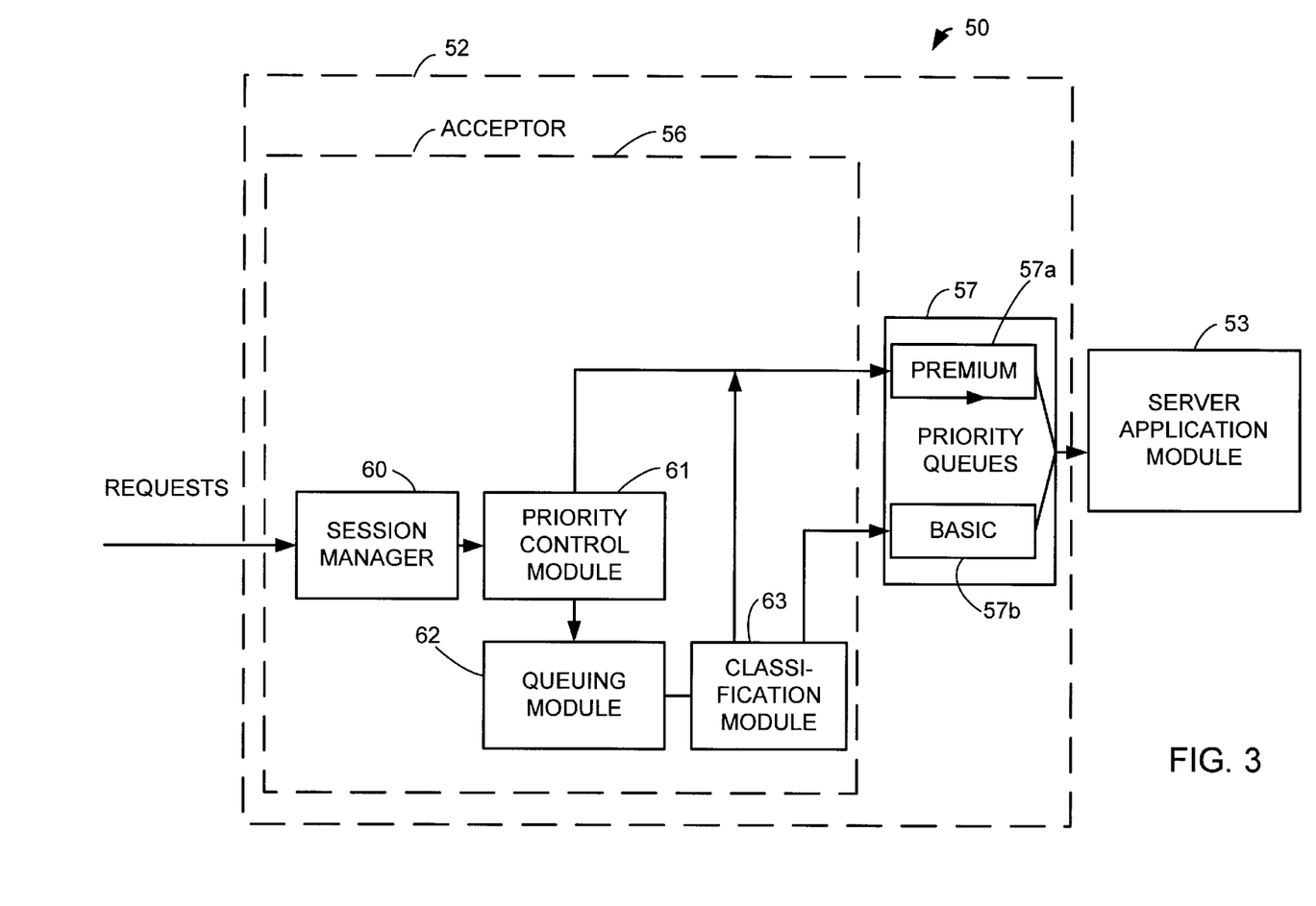
FIG. 3 shows the structure of a server application system that includes an acceptor that implements one embodiment of the present invention.

FIG. 3 shows a server application system 50 that includes a quality-of-service (QoS) middleware 52 and a server application module 53. The QoS middleware 52 includes an acceptor 56 that implements one embodiment of the present invention.

As will be described in more detail below, the acceptor 56 is used for admitting incoming requests to the server application module 53. The acceptor 56 of the present invention features early prioritization and adaptive processing of the incoming requests to the server application module 53. The early prioritization means that the acceptor 56 prioritizes its processing so that it processes premium requests before it processes basic requests. The adaptive processing allows the acceptor 56 to adapt to input load of the server application system 50. This means that the acceptor 56 can automatically modify its configuration settings based on the input load. The adaptive processing also allows the acceptor 56 to balance its prioritized processing by only allowing a predetermined number of the incoming requests to be sent to the server application module 53 during each processing cycle. If only the predetermined number of premium requests are received in a cycle, the acceptor 56 sends all of the premium requests to the server application module 53. If the premium requests received in a cycle exceed the predetermined number, the acceptor 56 only sends the predetermined number of the premium requests to the server application module 53. If the premium requests received in a cycle are less than the predetermined number, the acceptor 56 then sends the predetermined number of a mixture of the premium requests and basic requests to the server application module 53. This way, the acceptor 56 adaptively processes the incoming requests that have been prioritized.

In accordance with one embodiment of the present invention, the acceptor 56 includes a session manager 60 that determines the class of an incoming request (i.e., premium or basic). Premium may mean that the request is for an existing session that requires preferential treatment. Basic may mean that the request is for a new session or an existing session that does not require preferential treatment. A queuing module 62 is provided to store the request if the incoming request is a basic request. A priority control module 61 is provided to ensure that a predetermined number of requests are sent to the server application module 53 for service in each cycle.

The priority control module 61 sends all of the premium requests to the server application module 53 if only the predetermined number of premium requests are received in a cycle. The priority control module 53 only sends the predetermined number of the premium requests to the server application module 53 if the premium requests received in a cycle exceed the predetermined number. The priority control module 53 sends the predetermined number of a mixture of the premium requests and basic requests to the server application module 53 if the premium requests received in a cycle are less than the predetermined number.

The selection of the basic requests to be sent to the server application module 53 is done by the queuing module 62 and the classification module 63 of the acceptor 56. The classification module 63 classifies the basic requests into the existing session requests and the new session requests such that the existing session requests stored in the queuing module 62 can be first sent to the server application module 53 when the priority control module 61 requires that some of the basic requests be sent to the server application module 53 along with the premium requests. The structure and operation of the acceptor 56 will be described in more detail below, also in conjunction with FIGS. 3–9.

Referring again to FIG. 3, the server application system 50 can be any kind of server application system. In one embodiment, the server application system 50 is a TCP/IP-based server application system. This means that the server application module 53 is a TCP/IP-based server application. A TCP/IP-based server application is a connection-based server application. An example of such an application is a web content server, an e-mail server, a news server, an e-commerce server, a proxy server, a domain name server, and a local service server. This means that the server application system 50 can be any one of the above-mentioned server systems. Alternatively, the server application system 50 can be other type of server application system.

The server application system 50 can be implemented by or operates in a computer system or other data processing system with a network communication capability. The computer system that implements the server application system 50 can be server computer system, a workstation computer system, a personal computer system, or a mainframe computer system, a notebook computer system, or any other computer system.

The server application system 50 can be employed by an Internet Service Provider (ISP) to offer data services (e.g., web, news, advertisement, or e-mail) and other services (e.g., e-commerce) to users or subscribers connected to the server application system 50. Here, a customer means the entity contracting with the server application system 50 to have its content hosted in the server application system 50, or to have its services offered through the server application system 50. A user or subscriber means the entity accessing the server application system 50 through a remote user terminal via a communication network.

The server application module 53 performs the predetermined server function of the server application system 50. For example, if the server application system 50 is a web server, the server application module 53 performs the web server function which may include hosting web content and processing requests to retrieve their web pages. The server application module 53 is implemented using any known technology. The structure of the server application module 53 is also known and dependent on the type of server it implements. Thus, the structure of the server application module 53 will not to be described in more detail below.

The server application module 53 can be a static server or dynamic server. In one embodiment, the server application module 53 is a static server that stores static files only. In another embodiment, the server application module 53 may store both static and dynamic files. As is known, web content is generally classified as static, such as a file, or dynamic, such as cgi-scripts. Dynamic content may be generated at run-time by a back-end engine (e.g., a database engine) that is separate from the server itself.

The server application module 53 hosts content and/or applications that can be accessed by users external to the server application system 50. The server application module 53 can be any kind of server that stores a number of content files. Each of the content files can be accessed by an access request. The server application module 53 may also include a number of content sites, each storing a number of content files for access by multiple access requests. The multiple content sites may belong to different content providers or customers. The server application module 53 stores content files or dynamic executable code/program for access by requests. Thus, the content files hereinafter refer to (1) static content files, (2) dynamic content files, and (3) executable programs/codes.

The access to the server application module 53 may be done by a user at an external user terminal (not shown in FIG. 3) who generates and sends at least one request directed at the server application module 53. Alternatively, an access request may be generated by a client application system wanting to access the server application system 50.

The server application module 53 can process multiple requests at the same time. However, the server application module 53 has limits on the number of requests it can process per second. The processing limits also depend on the processing power of the server application module 53.

When the number of requests received by the server application module 53 greatly exceeds the processing limits of the server application module 53, the server application module 53 will be in an overload condition, resulting in at least unbearably longer response time and poor performance of the sever application module 53. This means when the request rate increases beyond the server capacity, server performance deteriorates dramatically, potentially causing a service outage. In addition, when a user issues a request and does not get any response, the user is likely to issue several more subsequent requests. This quickly increases the number of requests received by the server application module 53.

To resolve the problem, the QoS middleware 52 is used to process the income requests before they are sent to the server application module 53 for service. The QoS middleware 52 is referred to as middleware because it sits between the server application module 53 and the operating system (not shown) of the computer system (also not shown) that runs the server application system 50. Incoming requests are first received in the QoS middleware 52 from an external TCP listen queue (not shown in FIG. 3) before they are sent to the server application module 53 for servicing. The external TCP listen queue is within the kernel of the operating system that runs the server application system 50. The external TCP listen queue stores the incoming requests before they are processed by the server application system 50.

As described above, the QoS middleware 52 includes the acceptor 56 that implements one embodiment of the present invention. The acceptor 56 is connected to a priority queue 57. The priority queue 57 is then connected to the server application module 53.

The acceptor 56 performs the functions of early prioritization and adaptive processing of the prioritized requests. The acceptor 56 classifies each of the incoming requests into one of a number of classes. In one embodiment, the acceptor 56 classifies each incoming request as either a premium request or a basic request. A premium request means that the request is for an existing session and requires preferential treatment. A basic request means that the request is for a new session or an existing session and does not require preferential treatment. Alternatively, the acceptor 56 can classify each of the incoming requests into more than two classes. This process is referred to as early prioritization.

After the early prioritization is completed, the acceptor 56 sends the prioritized requests to the server application module 53 for service via the priority queue 57. In accordance with one embodiment of the present invention, the acceptor 56 only sends M number of requests to the priority queue 57 during each processing cycle, wherein M is a predetermined number. To achieve this, the acceptor 56 needs to determine which of the prioritized requests are to be included in the M number of requests to be sent to the priority queue 57 during each processing cycle. This is done by having the acceptor 56 scanning a number of prioritized requests during each processing cycle. If there are only M number of premium requests, the acceptor 56 sends all of the premium requests to the priority queue 57. If the premium requests in the scanned requests during a cycle exceed M, then the acceptor 56 only sends M number of the premium requests to the priority queue 57. If the premium requests in the scanned requests during a processing cycle are less than M, the acceptor 56 sends all of the premium requests plus some basic requests such that the total number of requests sent is equal to M. The selection of the M value is dependent on individual system and can be easily determined based on the configuration of the individual system.

The actual number of requests scanned during each processing cycle depend on a look-ahead parameter K, which is automatically set and dynamically changed based on the change in the input load. This means that the acceptor 56 examines K number of prioritized requests during each processing cycle to determine which requests should be included in the M number of requests sent. K is and should be equal to or greater than M.

The look-ahead parameter K is necessary to ensure that the server application module 53 can handle all the incoming premium requests. As described above, the look-ahead parameter K is used to determine when the acceptor 56 should allow some of the basic requests to be sent to the priority queue 57. The value of the parameter K is determined based on a maximum value, $K_{max}$, and a minimum value, $K_{min}$. The minimum value $K_{min}$ of the look-ahead parameter K is dependent on the input load. The larger the fraction of premium requests to the basic requests, the larger the minimum value for the look-ahead parameter K. Consequently, to ensure that an operator's preferences are met at all times, the acceptor 56 needs to adapt its parameters depending on the input load. In the embodiment in which each incoming request is classified either as a premium request or basic request, the look-ahead parameter K is determined as follows.

First, the maximum value $K_{max}$ is selected for the look-ahead parameter K. The $K_{max}$ value is chosen to be the length of external TCP listen queue (not shown). This is to ensure that the value of the look-ahead parameter K will never exceed the maximum number of requests that could be outstanding in the external TCP listen queue. This also means that the maximum value $K_{max}$ is a predetermined value.

Because the server application module 53 operates in cycles, the acceptor 56 needs to monitor, in each cycle, the incoming load and estimate the percentage of premium requests it can expect in the next cycle.

To ensure that all premium requests are successfully handled, the acceptor 56 computes the minimum value $K_{min}$ that the acceptor 56 must use as the number of requests to be scanned during the next cycle, based on the percentage of premium requests that the acceptor 56 expects to receive in the next cycle. This means that the minimum value $K_{min}$ is computed based on the input load the server application system 50 is actually experiencing.

Assume that the operator of the server application system 50 has specified his/her preference for the degree of differentiation as a percentage value (i.e., d). In this case, the look-ahead parameter K is calculated as $K=1+(K_{min}-1) \times d/100$.

The above choice of the look-ahead parameter K only takes into account the differentiation in terms of percentage of sessions successfully supported for premium sessions relative to basic sessions. It should also be clear that the look-ahead parameter K also determines the response time seen by premium sessions relative to basic sessions. This is because if K is large, then the premium requests spend less time in the queue and are processed earlier. However, a large value of K can reduce server capacity because the acceptor spends more resources scanning for premium requests. Since the importance of low response time relative to maximizing total server capacity is specified in the optimization criteria, the operator's choice of the optimization criteria should also govern the choice of the value of the look-ahead parameter K to use. Considering the extreme cases, if the operator chooses to optimize the total server capacity, the look-ahead parameter K value computed in the previous step must be used as is. Alternatively, if the operator chooses to optimize for minimum response time, the value of the look-ahead parameter K should be set to $K_{max}$.

For immediate choices of the optimization criteria, the look-ahead parameter K is computed by linear interpolation of the extreme values, i.e., $1+(K_{min}-1) \times d/100$ and $K_{max}$.

The acceptor 56 then sends the predetermined number (i.e., M) of requests to the priority queue 57. As can be seen from FIG. 3, the priority queue 57 includes a premium queue 57a and a basic queue 57b. The premium queue 57a stores only the premium requests received from the acceptor 56. The basic queue 57b stores only the basic requests received from the acceptor 56. Alternatively, the priority queue 57 is a single queue and each of the requests stored in the queue is marked as premium or basic.

Figure 4:
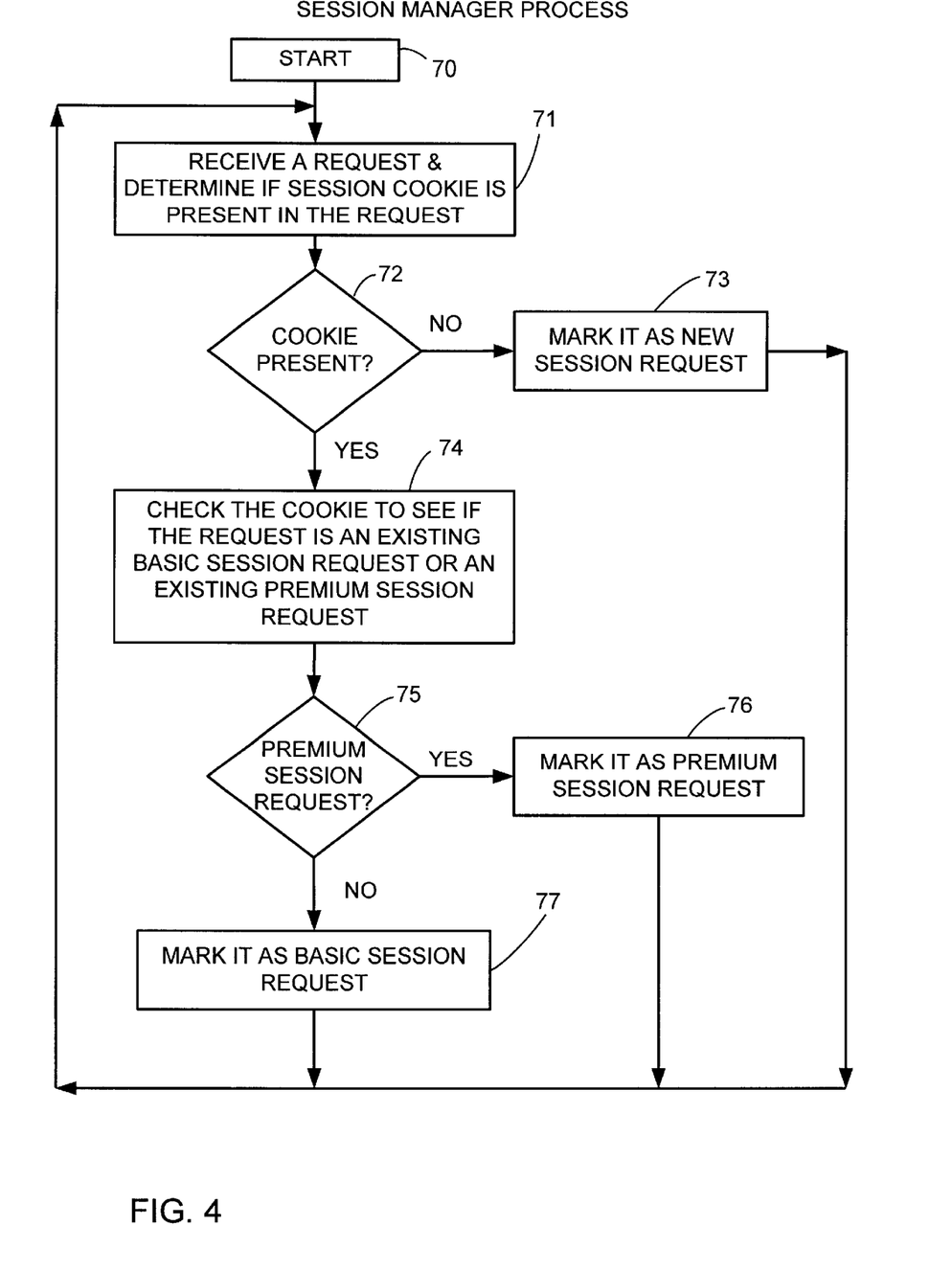
FIG. 4 is a flowchart diagram showing the process of the session manager of the acceptor of FIG. 3.

FIG. 3 also shows the structure of the acceptor 56 that implements one embodiment of the present invention. As can be seen from FIG. 3, the acceptor 56 includes the session manager 60, the priority control module 61, the queuing module 62, and the classification module 63. The session manager 60 is used to classify each of the incoming requests into various classes. For example and as described above, the session manager 60 classifies each request received as either a premium request or a basic request. The session manager 60 performs this classification function using the cookie contained in each request. If a request contains a session cookie, the request is for an existing session. If the request does not contain a session cookie, or if the request contains an expired session cookie, the request is classified as for a new session. The session manager 60 also distinguishes the basic existing session requests from the premium session requests. The session manager 60, however, does not distinguish the basic existing session request from the new session requests. They are all considered as basic requests. Thus, the session manager 60 classifies a request into the premium class if the request contains a session cookie that also indicates that the request requires special treatment, and classifies a request into the basic class if the request does not contain a session cookie (i.e., new session) or contains a session cookie that does not indicate that the request requires special preferential treatment. The session manager 60 can be implemented using any known technique. FIG. 4 shows in flowchart diagram form the process or operation of the session manager 60, which will be described in more detail below.

The priority control module 61 controls which and how many of the prioritized requests are sent to the server application module 53 for processing. As described above, the acceptor 56 only sends M number of requests to the server application module 53 during each processing cycle. In addition, priority needs to be given to premium requests when sending requests to the server application module 53. This task is performed by the priority control module 61. The priority control module 61 first scans K (i.e., the look-ahead parameter) number of requests that have passed the session manager 60 during each processing cycle. As also described above, the look-ahead parameter K is automatically set and can be dynamically changed based on the input load of the server application system 50. This is also done by the priority control module 61.

If the scanned requests contain only M number of premium requests, the priority control module 61 sends all of the premium requests to the priority queue 57. If the premium requests in the scanned requests during a cycle exceed M, then the priority control module 61 only sends M number of the premium requests to the priority queue 57. In one embodiment, the priority control module 61 sends the first M number of requests to the priority queue 57 and starts its scanning at the M+1 premium request during the next processing cycle. If the premium requests in the scanned requests during a processing cycle are less than M, the priority control module 61 sends all of the premium requests plus some basic requests such that the total number of requests sent is equal to M.

The determination of which of the basic requests to be sent to the server application module 53 is done by the queuing module 62 and the classification module 63. The classification module 63 further classifies the basic requests into the existing session requests and the new session requests such that the existing session requests stored in the queuing module 62 can be first sent to the server application module 53 when the priority control module 61 requires that some of the basic requests be sent to the server application module 53 along with the premium requests.

FIG. 4 shows the process or operation of the session manager 60 of FIG. 3. As can be seen from FIG. 4, the process starts at the step 70. At the step 71, the session manager 60 receives a request from the external TCP listen queue. The session manager 60 also determines if a session cookie is present in the request. As described above, the session cookie indicates if the request is for an existing session or a new session. In addition, the session cookie also contains other information (e.g., if the request is a premium session request). If a request contains an expired session cookie, the request is deemed as not containing a cookie. If the session cookie is determined not to be present at the step 72, then the step 73 is performed at which the request is marked or classified as a new session request. Then the process returns to the step 71.

If, at the step 72, it is determined that the request contains a session cookie, then the step 74 is performed at which the cookie is checked to determine if the request is a premium session request or a basic session request. If it is determined that the request is a premium session request at the step 75, then the step 76 is performed at which the request is marked as a premium session request and the process returns to the step 71.

If, at the step 75, it is determined that the request is a basic session request, then the request is marked as the basic session request at the step 77 and the process returns to the step 71.

Figure 5A:
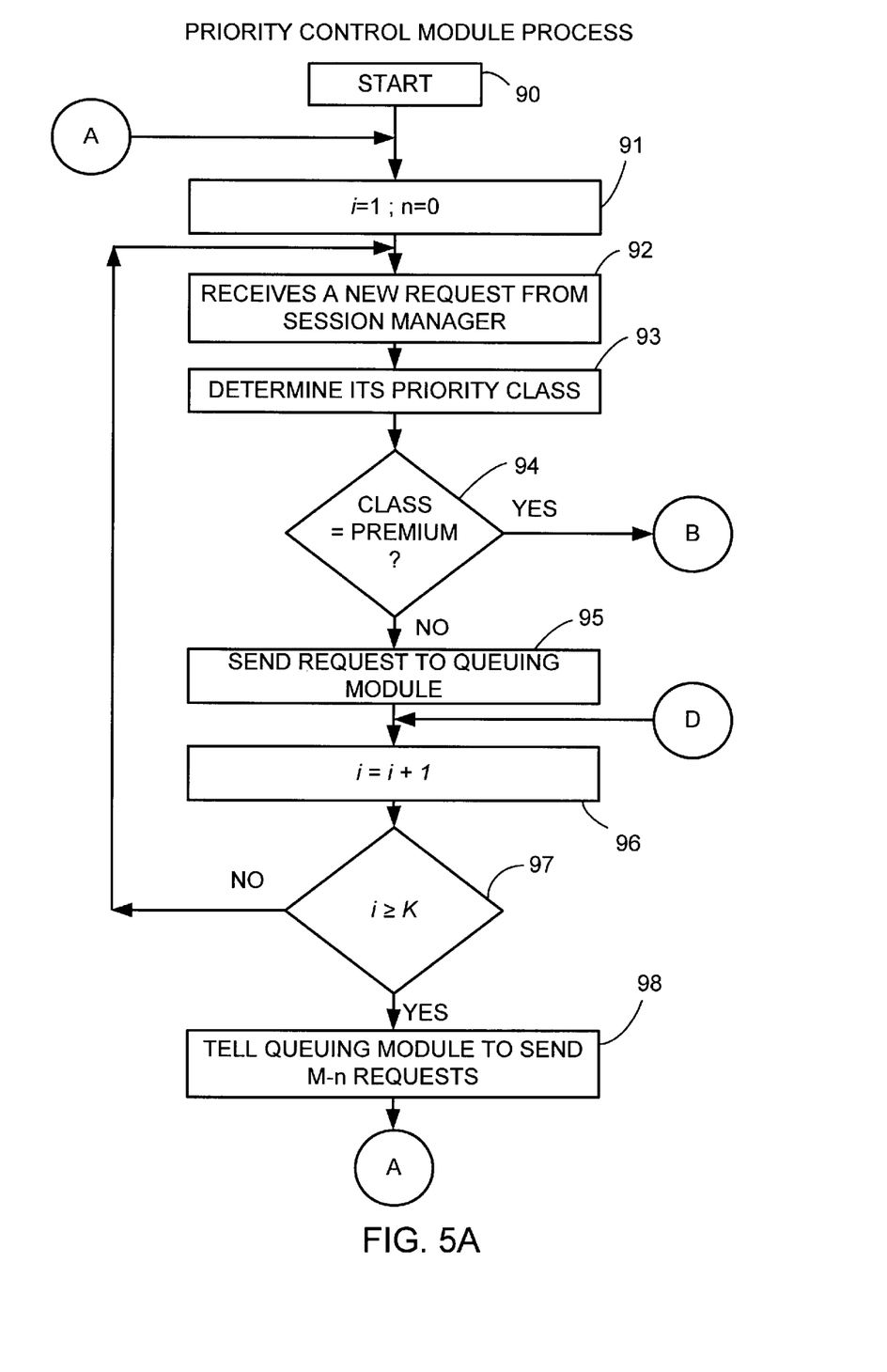
FIGS. 5A and 5B are flowchart diagrams showing the process of the priority control module of the acceptor of FIG. 3.
Figure 5B:
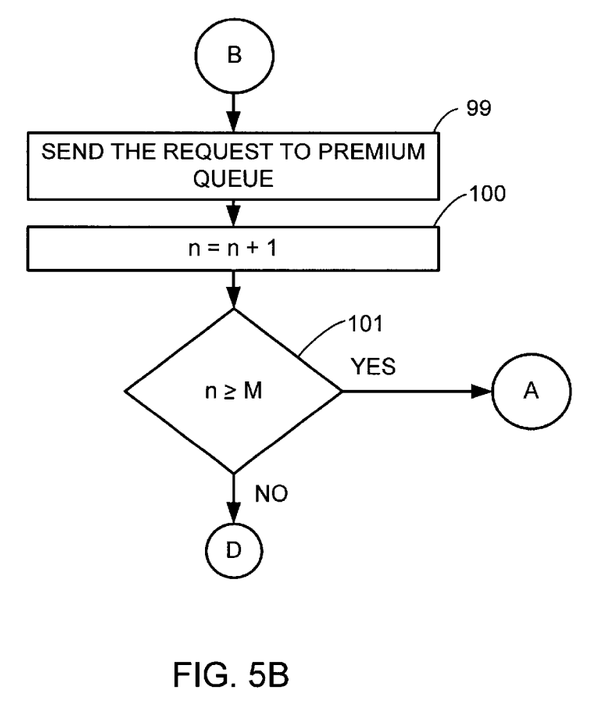

FIGS. 5A and 5B show the flowchart diagram of the process of the priority control module 61 of FIG. 3. As can be seen from FIGS. 5A–5B, the process starts at the step 90. At the step 91, the priority control module 61 sets two parameters (i.e., i and n) to the initial values (i.e., zero). Here, the variable i indicates the total number of requests the priority control module 61 has scanned during a processing cycle. The variable n indicates total number of premium requests the priority control module 61 has found so far in a processing cycle. At the step 92, the priority control module 61 receives a classified request from the session manager 60. At the step 93, the priority control module 61 checks the class of the request (e.g., premium or basic). It the request is found to be a premium session request at the step 94, the process jumps to the step 99. Otherwise, the step 95 is performed, at which the request is sent to the queuing module 62. At the step 96, the priority control module 61 increments i by one. Then the priority control module 61 determines if i is equal to or greater than K (i.e., the look-ahead value) at the step 97. This step is performed to determine if the priority control module 61 has reached the value of K (i.e., the look-ahead parameter). If not, the process returns to the step 92. Otherwise, the step 98 is performed at which the priority control module 61 informs the queuing module 62 to send M−n basic requests to the priority queue 57. This means that only the predetermined number of requests (i.e., M) are sent to the priority queue 57 during each cycle. The process then returns to the step 91 for the next cycle.

At the step 99, the priority control module 61 sends the request to the premium queue 57a. At the step 100, the priority control module 61 increments n by one. At the step 101, the priority control module 61 determines if n is equal to or greater than M. If not, the process moves to the step 96. If so, the process loops back to the step 91 for the next cycle.

FIGS. 6–9 show various comparison of the performance of the server application system 50 of FIG. 3 that employs the acceptor 56 in accordance with one embodiment of the present invention against the performance of prior art server application systems that do not contain the acceptor 56. In each of the comparison charts, prior art 1 indicates a server application system that does not contain any QoS middleware that differentiates between premium and basic requests. Prior art 2 indicates the prior art solution shown in FIG. 2.

Figure 6:
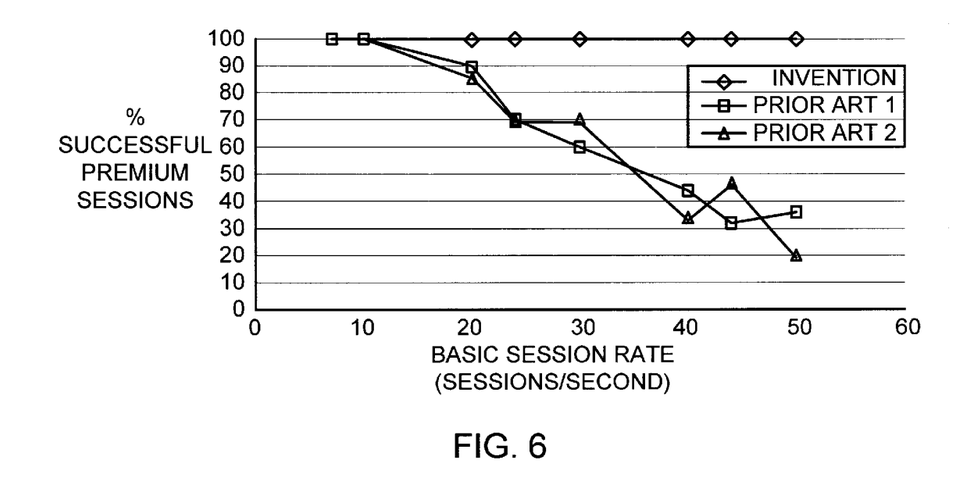
FIGS. 6–9 show various performance comparisons of the present invention model verses two prior art arrangements.
Figure 7:
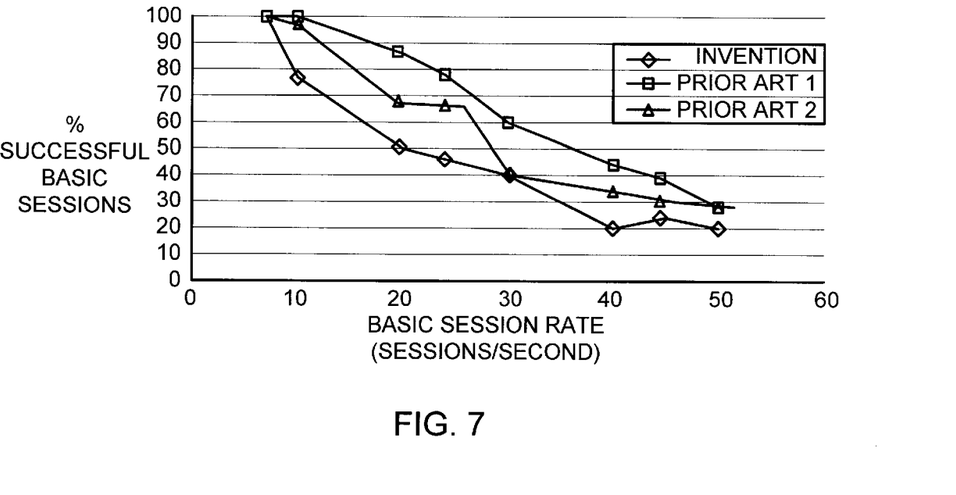

FIG. 6 shows the comparison in terms of the percentage of the premium requests that completed successfully. FIG. 7 shows the comparison in terms of the percentage of the basic requests that completed successfully. In this comparison, the premium class input load was held constant at ten sessions per second while the basic class input load was increased from six sessions per second to fifty sessions per second.

As can be seen from FIGS. 6–7, as the input load increases, both premium and basic session requests accessing the prior art 1 server application system experienced similar performance. This is due to the fact that prior art 1 system does not differentiate between premium and basic requests. The prior art 2 system also does not offer much prioritization between premium and basic session requests, as can be seen from FIGS. 6–7. This is because the QoS middleware 32 (FIG. 2) is a bottleneck when the input load is considered. As described above, the QoS middleware 32 of FIG. 2 implements FIFO request scheduling. This does not offer much difference between performance seen by premium and basic requests.

When the acceptor 56 of the present invention is employed, the server application system 50 is able to handle all of the premium requests even when the total session rate is three times the server capacity (i.e., sixty sessions per second—ten premium sessions and fifty basic sessions), as can be seen from FIG. 6. Of course, the preferential handling of premium requests is at the expense of basic requests. As FIG. 7 indicates, when the acceptor 56 in accordance with one embodiment of the present invention is used, the server application system 50 supports the lowest percentage of successful basic user session requests among the three systems considered.

Figure 8:
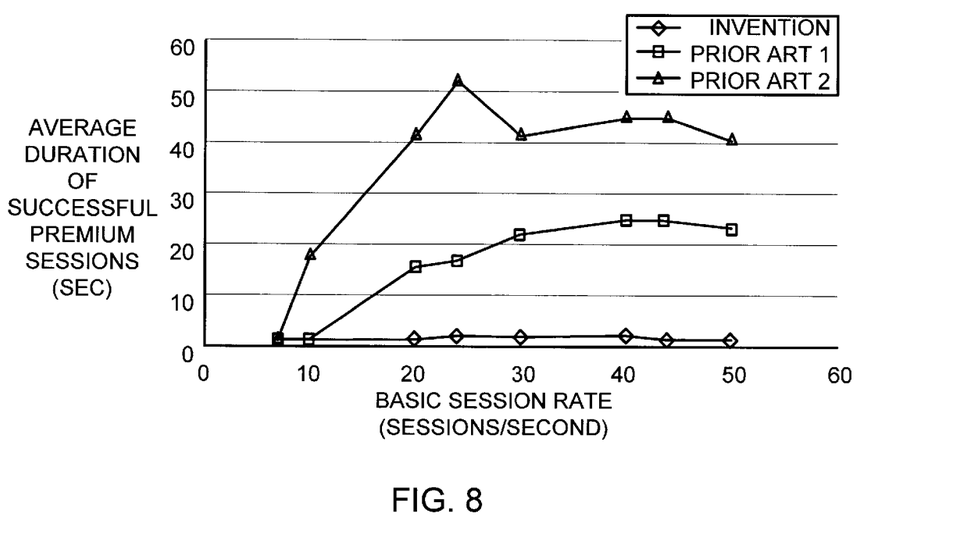
Figure 9:
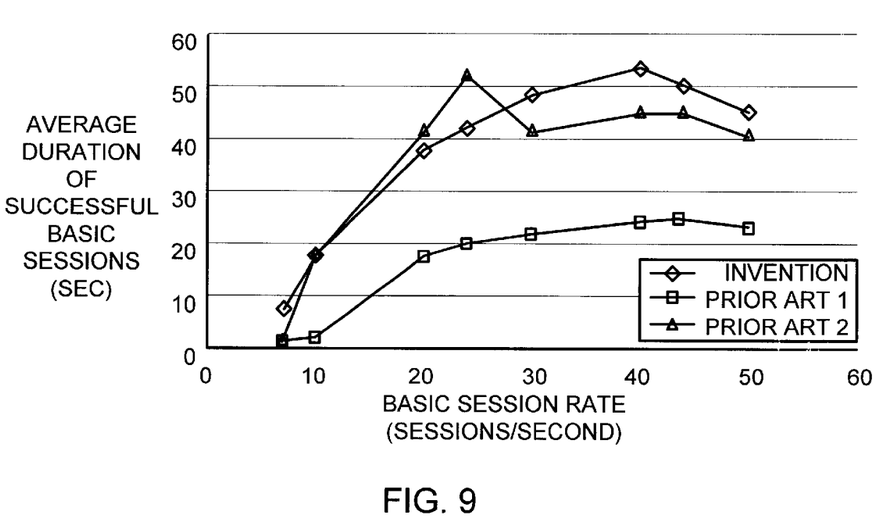

FIGS. 8 and 9 compare the average duration of premium and basic session requests that completed successfully. The comparison has factored out the user think time of 75 seconds (same for premium and basic requests). As can be seen from FIGS. 8–9, the acceptor 56 of the present invention enables the server application system 50 to offer significantly better performance for premium users than for basic users. At peak loads, while a basic session request takes about fifty seconds to complete, a premium session request only takes a couple of seconds to complete.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An acceptor for admitting incoming requests to an external server application, comprising:

a session manager that determines whether an incoming request is a premium existing session request;

a priority control module for ensuring identified existing session premium requests are made available to the server application in each server intake cycle ahead of other requests, wherein the priority control module (1) processes a maximum of K incoming requests during each cycle, (2) makes available a predetermined number M<K of premium requests to the server application during said cycle if at least M said incoming premium existing session requests have been processed by the priority control module during said cycle, and (3) makes available to the server application all the incoming premium existing session requests processed during said cycle if the number n of such requests is less than M; and a queuing module that holds the other requests that have been processed by the priority control module during the current cycle until all of the premium existing session requests processed during that cycle have been made available to the server application.

2. The acceptor of claim 1, wherein the server application is a TCP/IP-based server application.

3. The acceptor of claim 1, wherein the server application is a web server application.

4. The acceptor of claim 1, wherein the priority control module is coupled to the session manager, the queuing module, and the external server application.

5. The acceptor of claim 1, wherein when the priority control module makes available only n<M existing session premium requests to the server application, the priority control module causes the queuing module to forward M−n of the other requests in a first-in-first-out fashion.

6. The acceptor of claim 5, further comprising a classification module coupled to the queuing module to select which of the other requests are to be forwarded to the server application as premium new session requests.

7. The acceptor of claim 6, wherein the session manager also identifies other existing session requests and new session requests, and when the classification module forwards some of those other requests to the server application, the classification module gives priority to the other existing session requests.

8. The acceptor of claim 1, wherein M and K are predetermined values that are at least partially dependent on the system configuration, and at least K is automatically set and dynamically changed based on changes in the input load.

9. The acceptor of claim 1, wherein M and K are selected to maximize system capacity.

10. The acceptor of claim 1, wherein M and K are selected to minimize system response time for the premium existing session requests.

11. A method of admitting incoming requests to a server application during a server intake cycle, comprising determining for each of up to K incoming requests, whether the request is a premium existing session request, storing in a queuing module those incoming requests that are determined to not be premium existing session requests;

if at least M<K premium existing session requests are included in the K incoming requests, sending all M premium existing session;

if only n<M<K premium existing session requests are included in the K incoming requests, sending to the server application all n premium existing session requests and M−n other requests previously stored in the queuing module.

12. The method of claim 11, wherein the total number of requests sent to the server application during a particular server intake cycle is equal to M.

13. The method of claim 12, further comprising the steps of classifying the other requests stored in the queuing module as either existing session other requests or new session other requests; and selecting first the existing session other requests to be sent to the server application when some of the other requests need to be sent to the server application.

14. The method of claim 11, wherein M and K are predetermined values that are at least partially dependent on the system configuration, and at least K is automatically set and dynamically changed based on changes in the input load.

15. The method of claim 11, wherein M and K are selected to maximize system capacity.

16. The method of claim 11, wherein M and K are selected to minimize system response time for the premium existing session requests.

* * * * *